United States Patent [19]

Schweizer

[11] Patent Number: 4,904,043
[45] Date of Patent: Feb. 27, 1990

[54] OPTICAL DATA LINK DUAL WAVELENGTH COUPLER

[75] Inventor: Rudolph C. Schweizer, Allentown, Pa.

[73] Assignee: American Telephone and Telegraph Company, AT&T Bell Laboratories, Murray Hill, N.J.

[21] Appl. No.: 207,342

[22] Filed: Jun. 15, 1988

[51] Int. Cl.⁴ .............................................. G02B 6/32
[52] U.S. Cl. ............................. 350/96.18; 350/96.15
[58] Field of Search .............. 350/96.15, 96.18, 96.19

[56] References Cited

U.S. PATENT DOCUMENTS

| | | | |
|---|---|---|---|
| 4,078,852 | 3/1978 | Lebduska | 350/96.18 |
| 4,111,524 | 9/1978 | Tomlinson, III | 350/96.19 |
| 4,198,117 | 4/1980 | Kobayashi | 350/96.19 |
| 4,220,411 | 9/1980 | Cowen | 350/96.18 |
| 4,285,571 | 8/1981 | Winzer | 350/96.18 |
| 4,392,619 | 6/1986 | Weidel | 350/96.11 |
| 4,456,329 | 6/1984 | Henderson et al. | 350/96.18 |
| 4,475,424 | 10/1984 | Wagner | 350/96.19 |
| 4,522,462 | 6/1985 | Large et al. | 350/96.19 |
| 4,566,761 | 1/1986 | Carlsen et al. | 350/401 |
| 4,622,662 | 11/1986 | Laude et al. | 370/3 |
| 4,630,255 | 12/1986 | Gouali et al. | 370/3 |
| 4,701,010 | 10/1987 | Roberts | 350/96.15 |
| 4,767,171 | 8/1988 | Keil et al. | 350/96.18 |

Primary Examiner—John D. Lee
Assistant Examiner—Akm E. Ullah
Attorney, Agent, or Firm—Wendy W. Koba

[57] ABSTRACT

A dual wavelength optical coupler is disclosed which provides either bidirectional or unidirectional communication at different wavelengths over a single fiber. The coupler utilizes a dichroic filter and a set of three lenses to achieve dual wavelength communication. Additional blocking filters may be incorporated to decrease the degree of optical crosstalk present in the system.

30 Claims, 5 Drawing Sheets

OPTICAL DATA LINK DUAL WAVELENGTH COUPLER

BACKGROUND OF THE INVENTION

1. Field of the Invention

The present invention relates to an optical data link dual wavelength coupler and, more particularly, to such a coupler which provides either bidirectional or unidirectional communication over a single optical fiber.

2. Description of the Prior Art

In optical communication systems, the need may arise to multiplex different wavelength signals onto a single fiber. For example, wavelength multiplexing is one method for achieving full bidirectional transmission on a single fiber. In its simplest form, a bidirectional system may comprise two stations, S1 and S2, which transmit information at wavelengths $\lambda_1$ and $\lambda_2$, respectively. Thus, station S1 needs a transmitter which operates at $\lambda_1$ and a receiver which is tuned to wavelength $\lambda_2$. Station S2, obviously, has the opposite requirements. Each station also needs a duplexing element to inject both wavelengths onto the single transmitting fiber. Although simple in theory, such an arrangement is cumbersome in implementation. For example, each station comprises a separate transmitter, receiver, and duplexer. Therefore, some sort of optical coupling must also be provided, for example, by using optical waveguides. Such coupling requires many expensive and time-consuming adjustments to achieve optimum alignment. Additionally, the optical losses attributed to this coupling, including attachment between the duplexer, fiber, transmitter and receiver, may degrade the overall performance of the station to an unacceptable level.

An alternative to this straight-forward implementation is disclosed in U.S. Pat. No. 4,592,619 issued to E. Weidel on Jun. 3, 1986. Weidel discloses an optical coupling element utilizing a variety of microoptic elements with spherical and plane surfaces for collimating, focusing and redirecting transmitted/received lightwaves. Although an improvement over the prior art, the Weidel arrangement utilizes at least one optical element which must be traversed twice by a received light signal. Further, Weidel is necessarily limited to providing coupling between both a transmitter and receiver to an optical fiber. However, there exist situations wherein a pair of transmitters, operating at different wavelengths, must be coupled over the same fiber (unidirectional transmitter).

Thus, a need remains in the prior art for a dual wavelength optical coupler which is robust in design and is capable of operating in either a bidirectional mode (transmitter and receiver) or unidirectional mode (two transmitters or two receivers).

SUMMARY OF THE INVENTION

The need remaining in the prior art is addressed by the present invention which relates to an optical data link dual wavelength coupler and, more particularly, to such a coupler which provides either bidirectional or unidirectional communication over a single optical fiber.

In accordance with the teachings of the present invention, dual wavelength coupling is achieved utilizing a set of three lenses and a dichroic filter, all held in a precision die-cast housing with the active devices.

In one exemplary embodiment of the present invention, the coupler may be used a bidirectional transceiving device, including an LED operating at a first wavelength and a PIN receptive to a different wavelength.

In an alternative embodiment, the coupler may be used as a unidirectional device, including either a pair of LEDs at different wavelengths or a pair of PINs at different wavelengths.

It is an aspect of the present invention to avoid active alignment of the components forming the coupler. By careful choice of the lenses, alignment tolerances may be minimized to the extent that the filter and lenses may be merely placed in their proper locations within the housing.

Another aspect of the present invention is to provide a coupler design which is flexible enough to be utilized with a number of different lenses, as well as different transmitting and receiving wavelengths.

Other and further aspects of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
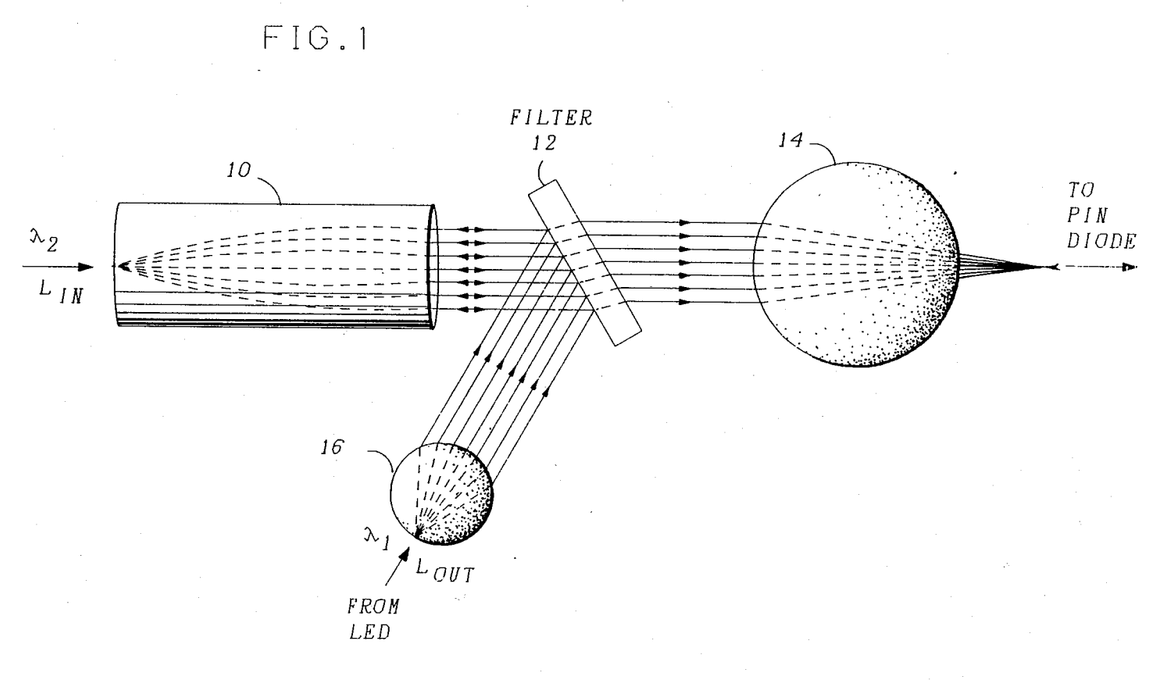
FIG. 1 is illustrative of the optics utilized in an exemplary bidirectional (transmitting/receiving) coupling arrangement of the present invention.

FIG. 1 illustrates the basic optics of a bidirectional coupling arrangement of the present invention. As shown, the arrangement comprises a first element, or lens 10, a dichroic filter 12, a first spherical lens 14 and a second spherical lens 16. In operation, an incoming lightwave signal $L_{IN}$, at wavelength $\lambda_2$, is coupled to lens element 10 which operates to transform the incoming lightwave to a collimated beam. Although element 10 is illustrated as a GRIN lens, other types of lenses (e.g. spherical, plano-convex) may also be used. The collimated beam then strikes dichroic filter 12 which is configured so as to allow the incoming lightwave at wavelength $\lambda_2$ to pass through unaffected (i.e., filter 12 is transparent to wavelength $\lambda_2$). This collimated incoming signal is then refocused by the first spherical lens 14 for reception by a light sensitive device, for example, a PIN diode (not shown).

An outgoing signal $L_{OUT}$ is provided by a light source, an LED (not shown) for example, operating at a different wavelength $\lambda_1$. As shown in FIG. 1, outgoing signal $L_{OUT}$ passes through second spherical lens 16 so as to form a collimated beam. The outgoing collimated beam then strikes dichroic filter 12, which is chosen to reflect this particular wavelength $\lambda_1$. Dichroic filter 12 thus redirects the outgoing beam $L_{OUT}$ onto lens element 10 which focuses beam $L_{OUT}$ and couples the beam into the core region of the optical fiber (not shown).

Figure 2:
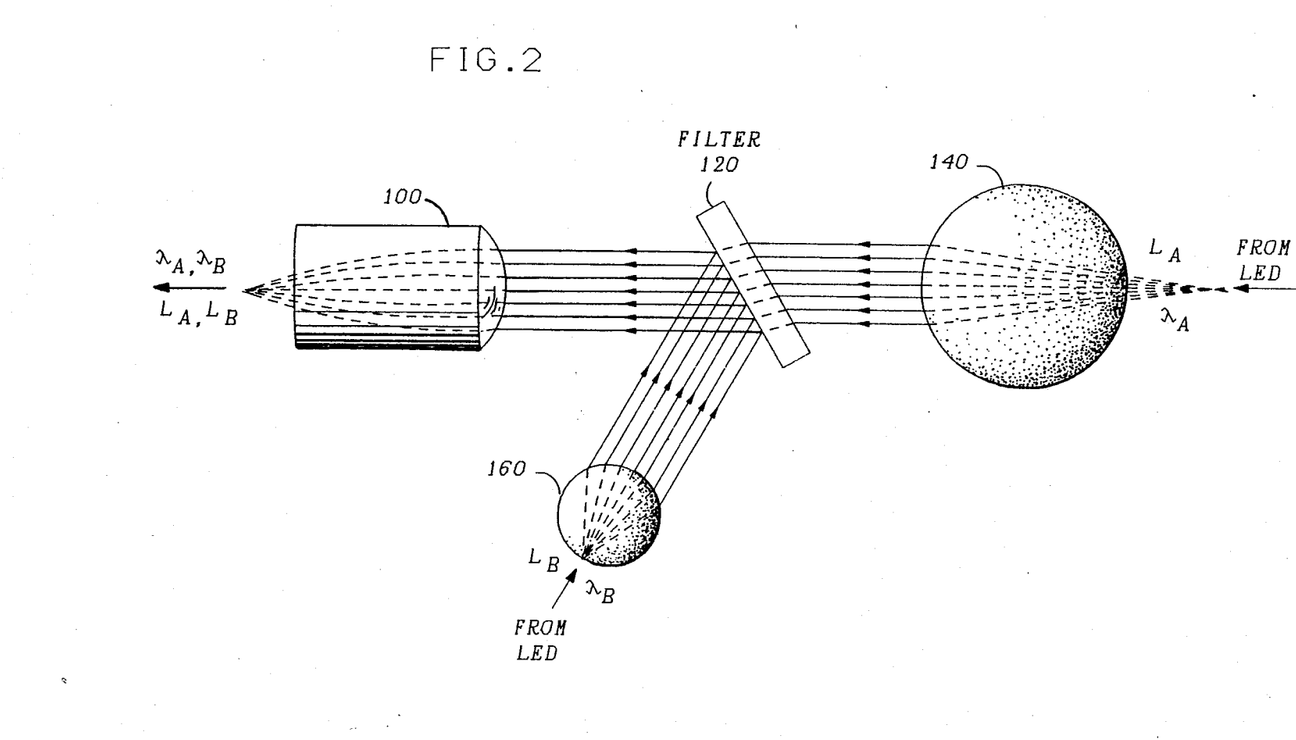
FIG. 2 is illustrative of the optics utilized in an exemplary unidirectional (transmitting) coupling arrangement of the present invention.

As stated above, the coupler of the present invention may be utilized in a unidirectional arrangement, that is, with a pair of transmitting devices or a pair of receiving devices. FIG. 2 illustrates an exemplary coupler for use with a pair of transmitting devices, LEDs, for example. Similar to the arrangement of FIG. 1, this coupler comprises a set of three lenses and a dichroic filter. In this example, however, light is transmitted in only one direction—out of the coupler and into an associated transmission fiber. In operation, a first LED (not shown) produces a first light signal $L_A$ at a wavelength $\lambda_A$. Light signal $L_A$ is then collimated by a first lens 140, shown as a spherical lens, and subsequently passed through a dichroic filter 120. Dichroic filter 120 is chosen to allow this particular wavelength to pass therethrough with a minimal amount of reflection (i.e., filter 120 is transparent to wavelength $\lambda_A$). The collimated light signal $L_A$ then passes through a second lens 100, shown here as a plano-convex lens, where the light is focused before being coupled to the core region of the transmission fiber (not shown).

In a similar fashion, a second LED (not shown) produces a second light signal $L_B$ at a different wavelength $\lambda_B$. The light signal $L_B$ is subsequently collimated by a third lens 160, illustrated as another spherical lens, and passed to dichroic filter 120. Light signal $L_B$, as shown in FIG. 2, is reflected by dichroic filter 120 into planoconvex lens 100, where it is focused into the associated fiber core region.

In order to provide a robust coupler, the optics must be chosen so as to achieve coupling between the fiber and a variety of different active transmitting and receiving devices. Obviously, each active device has different physical and optical characteristics, so that a different lens system would be necessary for optimum coupling using each different combination. The arrangement of the present invention, while not being optimal for any given pair of active transmitting/receiving devices, does provide acceptable performance.

One particular LED which may be used as a transmitting device with the coupling arrangement of the present invention is a 870 nm LED which typically has a flat surface with a 30 μm diameter active area. It has been determined that a 1.0 mm diameter sapphire ball may be used as second spherical lens 16,160 to provide the necessary collimation of the 870 nm lightwave. A high index material such as sapphire (n=1.75) is desirable since it provides a relatively high NA with moderate spherical aberration. Additionally, sapphire is known to be very hard and resistant to environmental attack. In order for the beam produced by this LED to couple through a lens element 10, such as a GRIN lens FIG. 1, the beam presented to dichroic filter 12 must be as collimated as possible. Thus, for an NA of 0.4, the separation between the LED and lens 16 must be less than 50 μm, if a 1.0 mm diameter sapphire ball is used as lens 16. For most applications, this separation is too small, that is, it cannot provide for the necessary wire bond connections to the LED surface. If the diameter of lens 16 is scaled to 2.0 mm, however, the lens-LED separation may be doubled (to 100 μm), providing sufficient room to perform the LED wire bonding operations.

Figure 3:
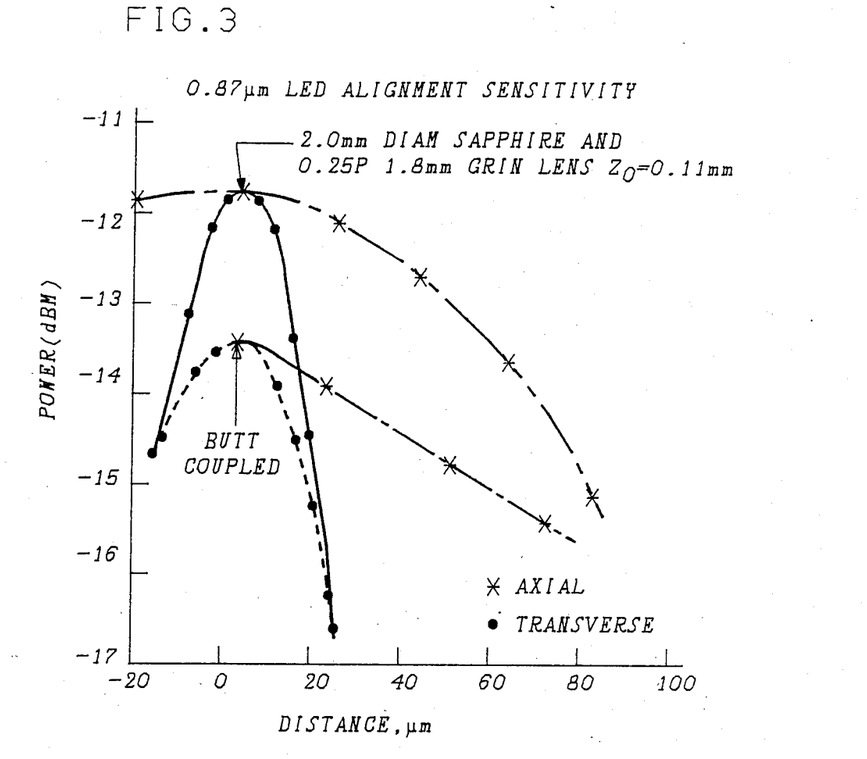
FIG. 3 is a graph illustrating alignment sensitivity of a transmitting device including the optics of FIG. 1, as compared with a conventional buttcoupled prior art scheme.

Once the specific choice for spherical lens 16 has been made, the appropriate collimating element 10 must be chosen so as to provide the desired magnification and coupling. For example, the utilization of a quarter-pitch GRIN lens comprising a diameter of approximately 1.8 mm with a 2.0 mm sapphire spherical lens results in an LED magnification of 1.6× at the fiber. The utilization of a quarter-pitch 1.8 mm GRIN lens as collimating element 10 also provides for a significant increase in coupling as compared to a straight-forward butt-coupled arrangement. FIG. 3 illustrates this comparison, showing both axial and transverse alignment measurements. In particular, the approximate coupled power associated with the aligned butt-coupled arrangement is approximately −13.4 dBm, as compared with approximately −12 dBm for the lensed system of the present invention.

Another LED choice for use with the coupling arrangement of the present invention is a 1300 nm LED. Unlike the 870 nm LED discussed above, an exemplary 1300 nm LED may include a lensed surface to optimize butt-coupled power. It has been determined that, on average, coupling to lensed LEDs cannot be improved with additional lenses. Therefore, this particular LED (or any similar lensed LED) will perform adequately with the GRIN lens/spherical lens arrangement chosen for use with the 870 nm flat LED. In fact, to reduce the cost of a system using this lensed LED, a 2.0 mm glass ball (n=1.52) may be used as spherical lens 16 in place of the sapphire ball discussed above; the same lens holder may then be utilized regardless of the specific LED included in the system. It is to be understood that a flat surfaced 1300 nm LED including requisite lensing, may also be utilized in the inventive arrangement.

In order to provide bidirectional communication, the dual wavelength multiplexer of the present invention must also provide coupling between the communication fiber and a photodetecting device by producing an image of the fiber at the photodetector surface. One such photodetecting device employed in this type of arrangement in an InGaAs PIN photodiode which has an active spot size of only 75 μm in diameter. Additionally, it has been determined that for optimal packaging, the image should be at least 0.8 mm behind spherical lens 14. Considering the use of the 1.8 mm GRIN lens as element 10, the beam radius at the output of lens 10 will be approximately 0.55 mm for a ray exiting the fiber with an angle of 16.8° (0.29 NA). The utilization of a 3.0 mm glass ball as spherical lens 14, in combination with the 1.8 mm GRIN lens, yields a paraxial focus 0.75 mm behind the lens. This results in a image spot size of 72 μm in diameter, a close match to the spot size of the InGaAs PIN.

Another choice for a photodetecting element in this arrangement is a silicon PIN. The coupling of this diode to the fiber is somewhat simpler than that of the InGaAs diode, since a Si PIN has a relatively large spot size (150-200 μm). Therefore, the 3.0 mm glass lens described above would be more than sufficient for use with this particular PIN. In order to simplify the manufacture, the same 3.0 mm lens could be used, regardless of which photodetecting device is employed.

Figure 4:
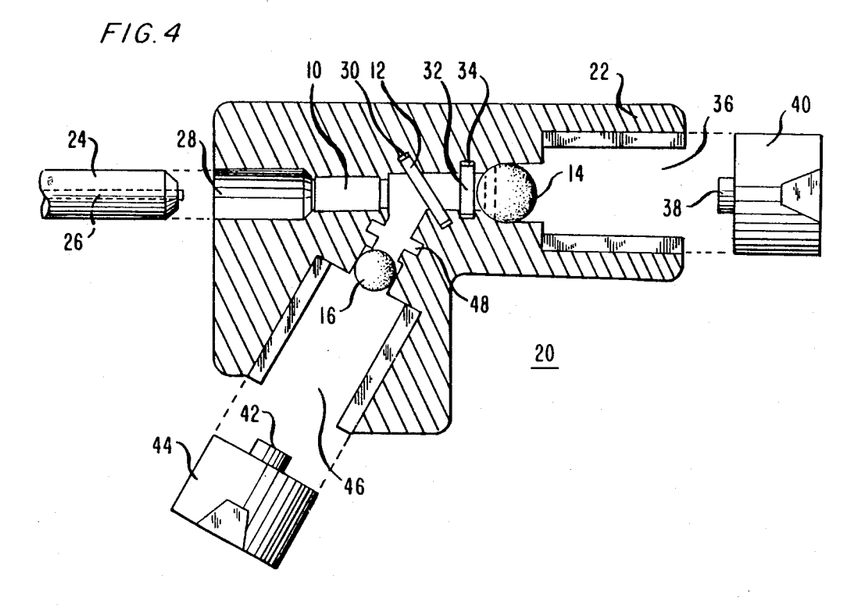
FIG. 4 illustrates an exemplary coupling arrangement of the present invention, including the optics discussed with respect to FIG. 1 as formed in an exemplary low-cost, die-cast housing.

An exemplary dual wavelength transceiving multiplexer sub-assembly 20 is illustrated in FIG. 4. Subassembly 20 consists of a die cast housing 22, fabricated of zinc, for example. Zinc is a preferred material for this housing since it is relatively inexpensive, yet may be precisely formed to provide the required alignment of the inventive lens system. Referring to FIG. 4, a fiber ferrule 24 housing an optical fiber 26 is inserted into an opening 28 in housing 22. GRIN lens 10 is also positioned in opening 28 so as to abut ferrule 24. A first slot 30 in housing 22 is formed to hold dichroic filter 12 at the predetermined angle required to pass the incoming lightwave signal $L_{IN}$ and reflect the outgoing lightwave signal $L_{OUT}$. For example, an angle of 30° may be used. A blocking filter 32, positioned in a second slot 34 in the path of the incoming lightwave, may be inserted to further decrease optical crosstalk by blocking the outgoing lightwave radiation at the wavelength $\lambda_1$ from reaching the PIN. Spherical lens 14, a 3.0 mm glass ball, is inserted in an opening 36 in housing 22 so as to be aligned with filter 12 and optional filter 32. A PIN 38, mounted on a header 40 is then inserted in opening 36 behind lens 14. Although active alignment of lens 10, filter 12 and lens 14 is not required, active alignment of PIN 38 is necessary. However, such alignment is performed in conventional data link assembly processes and is not difficult.

The transmission portion of sub-assembly 20 consists of an LED 42, mounted on a header 44 being positioned in an opening 46 in housing 22. Opening 46 must be formed in housing 22 so as to provide alignment between LED 42 and dichroic filter 12. As with PIN 38, active alignment of LED 42 is necessary. Spherical lens 16 is positioned in a narrowed portion of opening 46 between LED 42 and filter 12. As shown in FIG. 4, a third slot 48 is formed in housing 22 between lens 16 and filter 12 to allow for the insertion of an additional blocking filter (not shown). This blocking filter, similar to blocking filter 32 included in the received signal path, may be utilized to decrease the crosstalk between the transmitted and received signals by preventing any portion of incoming signal $L_{IN}$ at wavelength $\lambda_2$ from reaching the LED.

Figure 5:
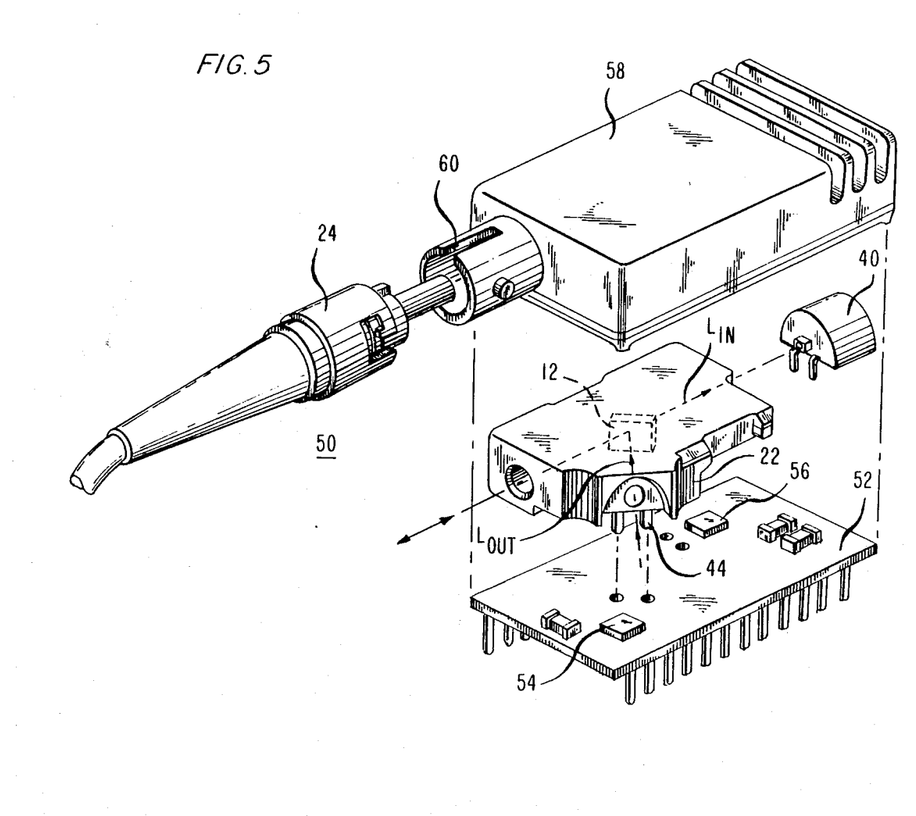
FIG. 5 illustrates an exemplary optical data link assembly including a dual wavelength multiplexer formed in accordance with the present invention.

An exemplary dual wavelength multiplexer 50 including sub-assembly 20 of FIG. 4 is shown, in an exploded view, in FIG. 5. Dichroic filter 12 is shown in phantom to illustrate the directions of the various signal paths for incoming signal $L_{IN}$ and outgoing signal $L_{OUT}$. LED header 44 and PIN header 40 are also illustrated in FIG. 5. As shown, sub-assembly 20 is inserted onto a circuit board 52 including a transmitter integrated circuit 54 and receiver integrated circuit 56. A cover 58 is used to encapsulate the coupler, where fiber ferrule 24 mates with an appropriate connector 60 formed on cover 58.

I claim:

1. A dual wavelength optical communication arrangement for providing optical communication between an optical fiber and a pair of colocated semiconductor optical devices, the arrangement comprising
    a first semiconductor optical device operable with a first optical signal at a first wavelength;
    a second semiconductor optical device operable with a second optical signal at a second wavelength;
    a first lens positioned to couple said first optical signal associated with said first semiconductor optical device;
    a second lens positioned to couple said second optical signal associated with said second semiconductor optical device;
    a dichroic filter positioned between said first lens and second lens so as to prevent both said first optical signal from entering said second lens and said second optical signal from entering said first lens; and
    a third lens positioned between said dichroic filter and said optical fiber for coupling said first and second optical signal with said optical fiber.

2. A dual wavelength optical communication arrangement as defined in claim 1 wherein the first and second semiconductor optical devices comprise semiconductor optical transmitting devices.

3. A dual wavelength optical communication arrangement as defined in claim 2 wherein both optical transmitters comprise light emitting diodes.

4. A dual wavelength optical communication arrangement as defined in claim 3 wherein the first device comprises an LED operating at a first wavelength of approximately 870 nm and the second device comprises an LED operating at a second wavelength of approximately 1300 nm.

5. A dual wavelength optical communication arrangement as defined in claim 1 wherein the first and second semiconductor optical devices comprise semiconductor optical receiving devices.

6. A dual wavelength optical communication arrangement as defined in claim 5 wherein both optical receivers comprise PIN photodiodes.

7. A dual wavelength optical communication arrangement as defined in claim 6 wherein the first device comprises an InGaAs PIN photodiode and the second device comprises a silicon PIN photodiode.

8. A dual wavelength optical communication arrangement as defined in claim 1 wherein the first semiconductor optical device comprises a transmitting device and the second semiconductor optical device comprises a receiving device.

9. A dual wavelength optical communication arrangement as defined in claim 8 wherein the first device comprises an LED and the second second comprises a PIN photodiode.

10. A dual wavelength optical communication arrangement as defined in claim 9 wherein the first device is chosen from the group consisting of 870 nm LEDs and 1300 nm LEDs, and the second device is chosen from the group consisting of InGaAs photodiodes and silicon photodiodes.

11. A dual wavelength bidirectional optical coupler comprising
    optical transmitting means for providing an outgoing optical signal at a first wavelength $\lambda_1$;
    optical receiving means for detecting an incoming optical signal at a second wavelength $\lambda_2$;
    a first lens element capable of collimating said incoming optical signal and focusing said outgoing optical signal;
    a dichroic filter positioned so as to transfer the collimated incoming optical signal exiting said first lens into said optical receiving means and transfer the outgoing optical signal produced by said optical transmitting means into said first lens;
    a second lens disposed at an appropriate distance behind said dichroic filter for focusing said incoming optical signal at the optical receiving means; and
    a third lens disposed at an appropriate location between said dichoric filter and said optical transmitting means for collimating said outgoing optical signal produced by said optical transmitting means and directing the collimated outgoing optical signal into said dichroic filter.

12. A dual wavelength bidirectional optical coupler as defined in claim 11 wherein the first lens comprises a graded index lens; and
the second and third lenses comprise a pair of spherical lenses.

13. A dual wavelength bidirectional optical coupler as defined in claim 11 wherein
the first lens comprises a plano-convex lens; and
the second and third lenses comprise a pair of spherical lenses.

14. A dual wavelength bidirectional optical coupler as defined in claim 11 wherein the optical transmitting means is chosen from the group consisting of 870 nm light emitting diodes and 1300 nm light emitting diodes, and the optical receiving means is chosen from the group consisting of InGaAs PIN photodiodes and silicon photodiodes.

15. A dual wavelength bidirectional optical coupler as defined in claim 14 wherein
the first lens comprises a quarter pitch graded index lens having a diameter of approximately 1.8 mm;
the dichroic filter is disposed at an angle of approximately 30° to allow for transmission of the incoming optical signal and reflection of the outgoing optical signal;
the second lens comprises a glass spherical lens having a diameter of approximately 3 mm; and
the third lens comprises a sapphire spherical lens having a diameter of approximately 2 mm.

16. A dual wavelength bidirectional optical coupler as defined in claims 11 or 12 wherein the coupler further comprises a receiver blocking filter disposed between the dichroic filter and the second lens for preventing the outgoing optical signal from reaching the optical receiving means.

17. A dual wavelength bidirectional optical coupler as defined in claims 11 or 12 wherein the coupler further comprises a transmitter blocking filter disposed between the dichroic filter and the third lens for preventing the incoming optical signal from reaching the optical transmitting means.

18. A dual wavelength unidirectional optical transmitter comprising
a first optical transmitting device for providing a first output signal at a first wavelength;
a first lens disposed to receive and collimate said first output signal;
a second optical transmitting device for providing a second output signal at a second wavelength;
a second lens disposed to receive and collimate said second output signal;
a coupling lens for focusing both said first collimated output signal and said second collimated output signal into a transmission waveguide; and
a dichroic filter positioned to transfer said collimated output signal exiting said first lens into said coupling lens, and reflecting the second collimated output signal exiting said second lens into said coupling lens.

19. A dual wavelength unidirectional optical transmitter as defined in claim 18 wherein the first and second optical transmitting devices comprise light emitting diodes.

20. A dual wavelength unidirectional optical transmitter as defined in claim 19 wherein the light emitting diodes operate at 870 nm and 1300 nm.

21. A dual wavelength unidirectional optical transmitter as defined in claim 18 wherein the first lens and second lens comprise a pair of spherical lenses and the coupling lens comprises a graded index lens.

22. A dual wavelength unidirectional optical transmitter as defined in claim 18 wherein the first lens and second lens comprise a pair of spherical lenses and the coupling lens comprises a plano-convex lens.

23. A dual wavelength unidirectional optical transmitter as defined in claim 18 wherein the coupler further comprises
a first blocking filter disposed between the dichroic filter and the first lens for preventing the second output signal from passing through the dichroic filter and entering the first lens; and
a second blocking filter disposed between said dichroic filter and the second lens for preventing the first output signal from passing through the dichroic filter and entering the second lens.

24. A dual wavelength unidirectional optical receiver comprising
a first optical receiving device responsive to a first input signal at a first wavelength;
a first lens disposed to receive said first input signal and focus said first input signal into said first optical receiving device;
a second optical receiving device responsive to a second input signal at a second wavelength;
a second lens disposed to receive said second input signal and focus said second input signal into said second optical receiving device;
a collimating lens for receiving both said first and second input signals and providing as an output collimated versions thereof;
a dichroic filter positioned to transfer the collimated first input signal exiting said collimating lens to said first lens, and reflect the collimated second input signal exiting said collimating lens to said second lens.

25. A dual wavelength unidirectional optical receiver as defined in claim 24 wherein the first and second optical receiving devices comprise a pair of photodiodes.

26. A dual wavelength unidirectional optical receiver as defined in claim 25 wherein the photodiodes comprise a silicon photodiode and an InGaAs PIN diode.

27. A dual wavelength unidirectional optical receiver as defined in claim 24 wherein the first and second lens comprise a pair of spherical lenses and the collimating lens comprises a graded index lens.

28. A dual wavelength unidirectional optical receiver as defined in claim 24 wherein the first and second lens comprise a pair of spherical lenses and the collimating lens comprises a plano-convex lens.

29. A dual wavelength unidirectional optical receiver as defined in claim 24 wherein the receiver further comprises
a first blocking filter disposed between the first lens and the dichroic filter for preventing the second input signal from entering said first lens; and
a second blocking filter disposed between the second lens and said dichroic filter for preventing the first input signal from entering said second lens.

30. A bidirectional dual wavelength optical multiplexer comprising
an optical transmitting device for providing an optical output signal at a first wavelength;
first circuit means for providing an electrical input signal to said optical transmitting device;
an optical receiving device responsive to an optical input signal at a second wavelength and providing as an output an electrical version thereof;

second circuit means coupled to said optical receiving device for providing an electrical output signal in response to the received optical input signal, said first and second circuit means being formed on a single circuit board;

an optical multiplexer subassembly for mating with said circuit board, said optical multiplexer subassembly comprising a first lens element capable of collimating said optical input signal and focusing said optical output signal;

a dichroic filter positioned so as to transfer the collimated input signal exiting said first lens element and transfer the optical output signal into said first lens element;

a second lens disposed at an appropriate distance behind said dichroic filter for focusing said collimated optical input signal into said optical receiving device;

a third lens disposed at an appropriate location between said dichroic filter and said optical transitting device for collimating said optical output signal and directing said collimated optical output signal at said dichroic filter.

* * * * *